(12) United States Patent
Jiang (10) Patent No.: US 10,846,876 B2
(45) Date of Patent: Nov. 24, 2020

(54) INTENDED INTEREST POINT DETECTION METHOD AND SYSTEM THEREOF

(71) Applicant: Yu-Sian Jiang, Austin, TX (US)

(72) Inventor: Yu-Sian Jiang, Austin, TX (US)

( * ) Notice: Subject to any disclaimer, the term of this patent is extended or adjusted under 35 U.S.C. 154(b) by 89 days.

(21) Appl. No.: 16/178,610

(22) Filed: Nov. 2, 2018

(65) Prior Publication Data

US 2020/0143562 A1 May 7, 2020

(51) Int. Cl.
*G06T 7/70* (2017.01)
*G06T 7/73* (2017.01)
*G06K 9/00* (2006.01)

(52) U.S. Cl.
CPC ............ *G06T 7/74* (2017.01); *G06K 9/00604* (2013.01); *G06T 2207/10016* (2013.01); *G06T 2207/30201* (2013.01)

(58) Field of Classification Search
CPC ............ G06T 7/74; G06T 2207/10016; G06T 2207/30201; G06K 9/00604
USPC ............................................. 382/103
See application file for complete search history.

(56) References Cited

U.S. PATENT DOCUMENTS

2016/0011658 A1\* 1/2016 Lopez ............... G06K 9/00597
345/156
2016/0291690 A1\* 10/2016 Thorn ............... H04N 5/23293

\* cited by examiner

*Primary Examiner* — Michael R Neff (57) ABSTRACT

An intended interest point detection method provided for detecting an intended POI of a person from a plurality of first images and at least one second image includes obtaining a plurality of gaze information of the person in the plurality of first images; obtaining a location information of at least one POI in the at least one second image; determining energy value by the plurality of gaze information and the at least one POI; and inferring the intended POI by minimizing the energy value. The energy value is decreased when the gaze point location is correlated to a POI, and/or when the intended POI is consistent in contiguous time frames.

16 Claims, 5 Drawing Sheets

INTENDED INTEREST POINT DETECTION METHOD AND SYSTEM THEREOF

BACKGROUND OF THE INVENTION

The present invention relates to a point of intended interest detection method and detection system, and particularly to an intended interest point detection method and system for detecting a point of interest attended by a user.

Inferring a person's attention or the intent point they are interested with (i.e. intended point of interest or intended POI) can be achieved by processing gaze information of the person. Conventionally, an eye tracking device is used to calculate the gaze vector of the person and identify the user's gaze point on a computer screen, i.e. the existing technology has provided methods of calculating the coordinates of computer screen where the user gaze at; however, it is not applicable to infer user's intended POI. The ability to infer user's intended POI in an object-oriented environment may be beneficial to the predictive operations and/or services.

SUMMARY OF THE INVENTION

Accordingly, in an embodiment of the present invention, a method is provided for detecting an intended POI of a person from a plurality of first images and at least one second image. The method includes: obtaining a plurality of gaze information of the person in the plurality of first images; obtaining a location information of at least one POI in the at least one second image; determining energy value by the plurality of gaze information and the at least one POI; and inferring the intended POI by minimizing the energy value. The energy value is decreased when the gaze point location is correlated to a POI, and/or when the intended POI is consistent in contiguous time frames.

In another embodiment of the present invention, a system is provided for detecting an intended POI of a person in first captured images and second captured images, the system includes a gaze processing unit, a scene processing unit and an inference processing unit. The gaze processing unit obtains a plurality of gaze information of the person in the plurality of first images. The scene processing unit is used to obtain a location information of at least one POI in the at least one second image. The inference processing unit is coupled to the gaze processing unit and the scene processing unit to receive the plurality of gaze information and the location information of the at least one POI, the inference processing unit executing instructions to perform operations including determining energy value by the plurality of gaze information and the at least one POI; and minimizing the energy value to infer the intended POI. The energy value is decreased when the gaze point location is correlated to a POI, and/or when the intended POI is consistent in contiguous time frames.

These and other objectives of the present invention will no doubt become obvious to those of ordinary skill in the art after reading the following detailed description of the preferred embodiment that is illustrated in the various figures and drawings.

DETAILED DESCRIPTION

An intended interest point detection system for detecting an intended POI of a person based on images is provided by the present invention. The POI may be any pre-determined object, icon, shape, or target that is attended by the person in any static or dynamic scene(s). The system can enable various useful applications. In some cases, by inferring the person's intended POI in a webpage, an advertisement poster, or any static or dynamic scene, a system can understand the person's interests, provide only relevant content that the person is interested with, or improve the context of the application based on the inference result. In other cases, the method can be used in automation of human-machine interface or human-robot interaction to accomplish the person's goals more easily.

In an aspect of the present invention, an intended interest point detection system that detects an intent of a person may acquire the person's gaze information and the location of at least one POIs from the scene to which the person is facing. Each POI is characterized by a probability value that indicates whether the person is attended to the represented POI or not. A relation between the gaze information and the at least one POIs may be characterized. The relation may be characterized by a value (e.g., energy value), which may include spatial and/or temporal factors, where the value decreases when the gaze location correlates the location of the POIs and/or when the intended POI is consistent in a given time interval. The POI that is attended by the person (i.e., the intended POI) may be obtained by finding the probability value of each POI at which the energy value is minimized. The node representing the POI that corresponds to the maximum probability value of an image frame is inferred as the intended POI. By using this approach, the system effectively removes noises and undesirable effects caused by such as eye blinks, dropped frames, and/or moving/shaking environment, thus achieving a reliable and stable inference result of intended interest point attended by the person.

Figure 1:
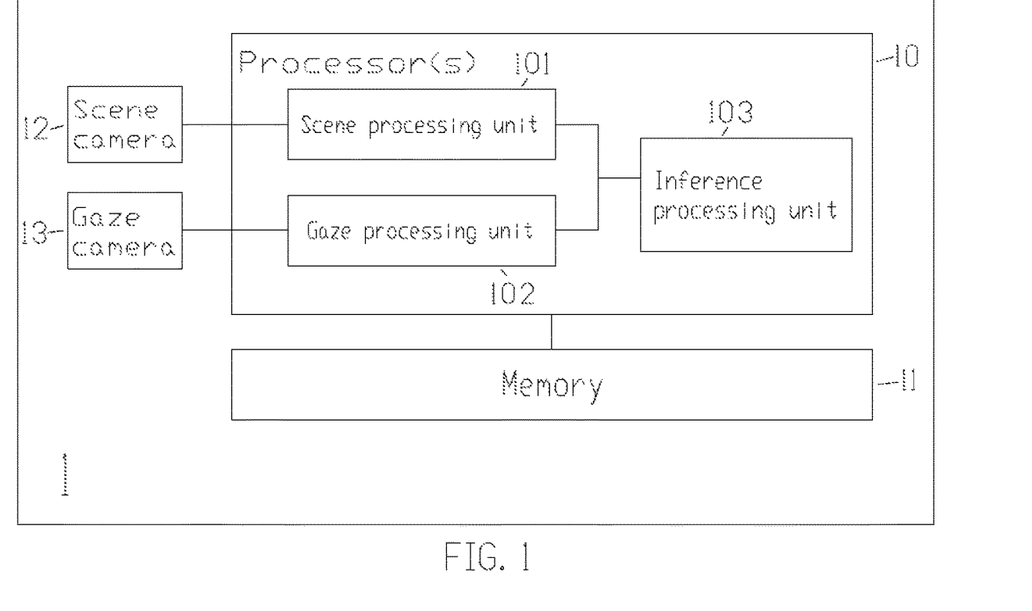
FIG. 1 illustrates a block diagram of the intended interest point detection system in accordance with an embodiment of the present invention.

As shown in FIG. 1, the intended interest point detection system 1 in accordance with an embodiment of the present invention includes at least one processor(s) 10, memory 11, a scene camera 12, and a gaze camera 13.

The processor(s) 10 may include a scene processing unit 101, a gaze processing unit 102, and an inference processing unit 103. The scene processing unit 101, gaze processing unit 102, and inference processing unit 103 may be realized in a single computing device or separated, multiple computing devices. For example, the gaze processing unit 102 and the gaze camera 13 may be included in an eye-tracking device which provides gaze information of the person to the inference processing unit 103. In another example, the scene processing unit 101 and the scene camera 12 may be included in another device which provides information of one or more interest points in a scene to the inference processing unit 103.

The processor(s) 10 may be any processor such as CPU, MCU (Micro Control Unit), AP (Application Processor), ASIC (Application-specific integrated circuit), DSP, FPGA, or a combination of above.

The memory 11 stores information accessible by processor(s) 10, including instructions and data that may be executed or otherwise used by the processor(s) 10. The memory 11 may be of any type capable of storing information accessible by the processor(s) 10, including a computer-readable medium, or other medium that stores data that may be read with the aid of an electronic device, such as a cache, hard-drive, memory card, ROM, RAM, DVD or other optical disks, as well as other write-capable and read-only memories. Systems and methods may include different combinations of the foregoing, whereby different portions of the instructions and data are stored on different types of media.

The instructions may be any set of instructions to be executed directly (such as machine code) or indirectly (such as scripts) by any one of the processing units in processor(s) 10. For example, the instructions may be stored as computer code on the computer-readable medium. In that regard, the terms "instructions" and "programs" may be used interchangeably herein. The instructions may be stored in object code format for direct processing by the processing units, or in any other computer language including scripts or collections of independent source code modules that are interpreted on demand or compiled in advance. Functions, methods and routines of the instructions are explained in more detail below.

Although FIG. 1 functionally illustrates the processing units 101, 102, and 103 as being within the same block, the interest point detection system 1, it will be understood by those of ordinary skill in the art that the processor and memory may comprise multiple processors and memories that may or may not be stored within the same physical housing. For example, memory may be a hard drive or other storage media located in a housing different from the rest of the interest point detection system 1.

In an aspect of the present invention, the inference processing unit 103 obtains a plurality of gaze information of the person in each frame of the first images captured by gaze camera 13. The plurality of gaze information may be computed by the gaze processing unit 102. The plurality of gaze information may be a gaze point, a gaze area, a gaze vector, or a probability distribution of a gaze region. The gaze point may be a two-dimensional coordinate system defined on a plane, which may be a screen, a display, a window, a windshield, or a virtual plane in front of the user. For example, the gaze point may be defined by a set of pixel coordinates on the screen. In another example, the gaze point may be a location in a pre-defined grid on a windshield. The gaze area may be a circular or an elliptical area in the plane. The probability distribution of the gaze region may be defined by aggregations of multiple gaze points and/or fixations, or the overlapping ratio of gaze area and interest point area in the plane.

The inference processing unit 103 further obtains interest point locations in several frames of the second images captured by scene camera 12. In an embodiment, a plurality of interest points may be pre-determined. Any object may be considered as an interest point, such as a sign, a window, a cup, a vehicle, and a pedestrian. The interest point locations may be computed by the scene processing unit 101 which executes an object detection algorithm to detect the location of any pre-determined interest points in the scene. The location of the detected interest points may be represented by bounding boxes projected on the same plane for the gaze information. It will be understood by those of ordinary skill in the art that a bounding box may be represented by the 2D coordinates of the top left corner and the width and height of the box, or two diagonal corners of the box.

The first images may be consecutive frames captured by a first camera for capturing the person's gaze information. In a static environment, the second image may be a static scene, in which the interest point may be pre-determined. In some cases, scene camera 13 may be replaced by any display device generating a scene such as a webpage, a picture, etc. In a dynamic environment, the dynamic scene may be captured by scene camera 13 to create multiple second images.

Figure 2:
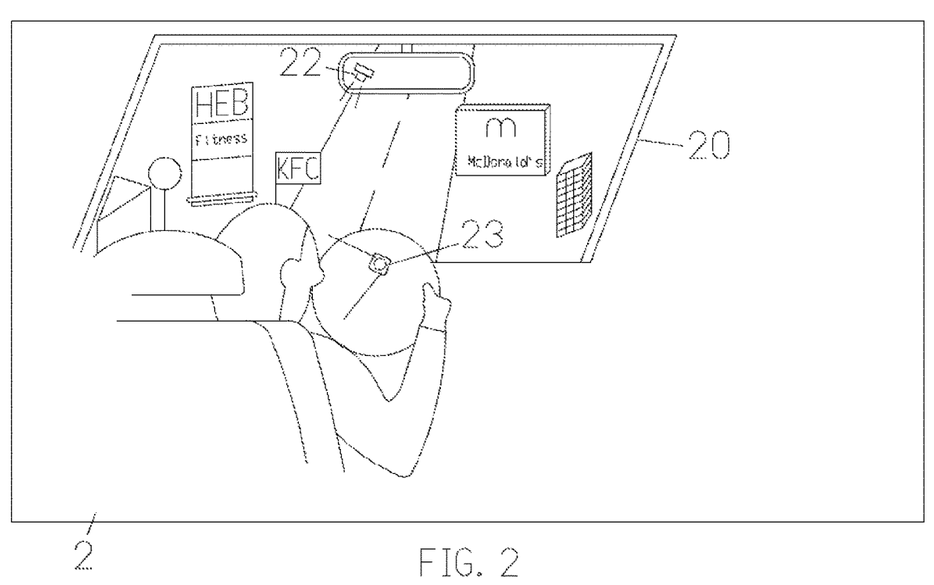
FIG. 2 shows an illustration of a vehicle use case of the intended interest point detection system in accordance with an embodiment of the present invention.
Figure 3:
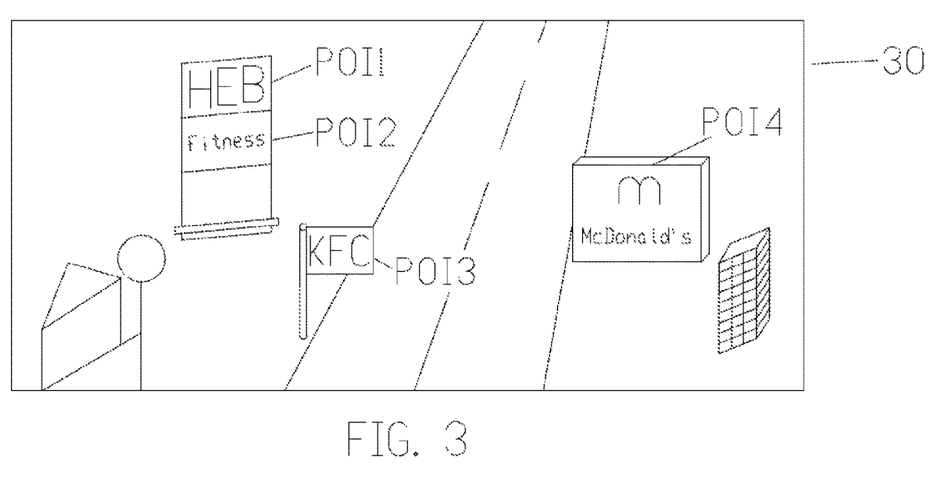
FIG. 3 illustrates an example of a scene in which POIs are detected and their location information is obtained based on the coordinate system of a 2D plane.

In an aspect of the present invention, the intended interest point detection system may be used in a vehicle to infer the vehicle passenger's intended POI. In an embodiment, the vehicle may be installed with two camera systems that are able to capture views of both the interior and exterior of the vehicle, where the exterior-facing camera captures images of the surrounding environment and the interior-facing camera captures images of the human's eyes for gaze analysis. FIG. 2 illustrates an example of such vehicle in accordance with the present invention. In this example, camera 22 is mounted near the rear-view mirror on the windshield 20 to capture the street view, and camera 23 is installed in the middle of the steering wheel to capture the driver's face. The cameras 22 and 23 may be coupled to processor(s), which may be located inside the vehicle and/or remotely in a cloud to compute the driver's gaze information, obtain the information of the interest points in the scene, and infer the driver's attended point in the scene. As shown in FIG. 3, the 3D scene is projected onto the 2D plane 30, where interest points POI1-POI4 in the street view such as shop signs, billboards, other vehicles, pedestrians, or certain objects are detected, and their information are given by the scene processing unit of the interest point detection system 2. The information of the interest point may be defined by a bounding box, which indicates the position and dimension information.

Figure 4:
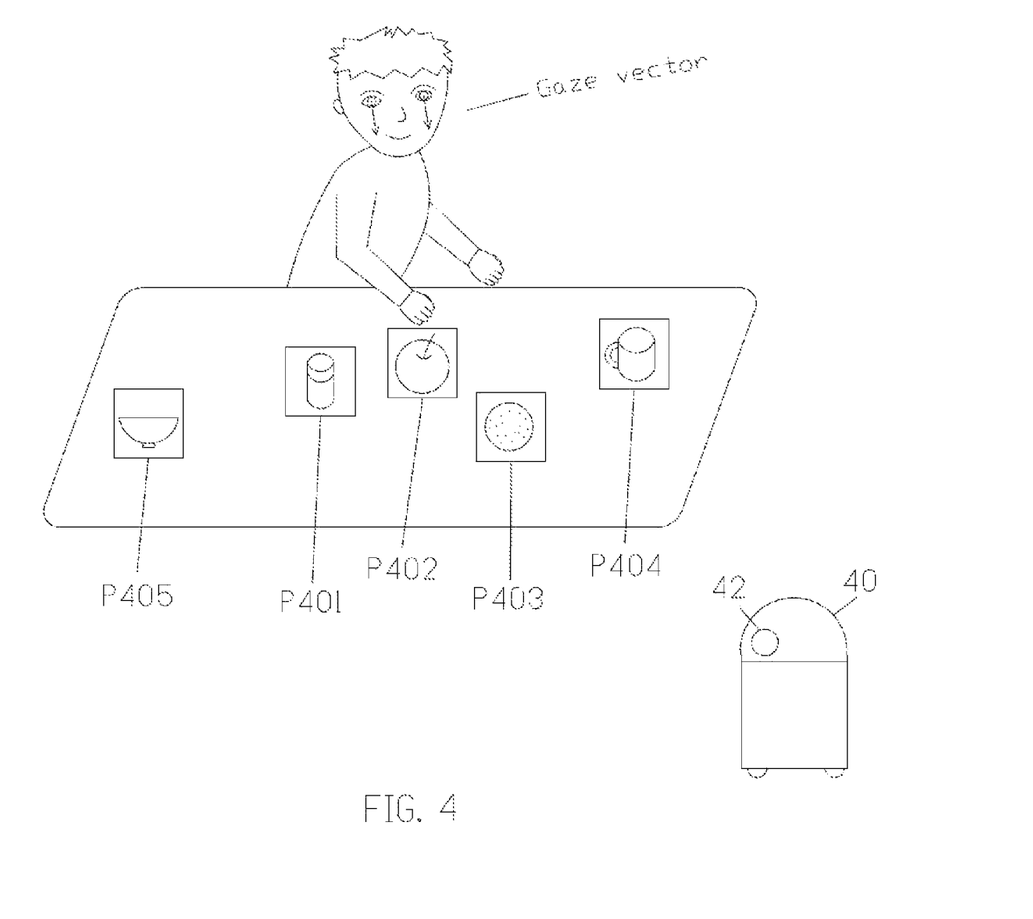
FIG. 4 shows an illustration of a robotic use case of the intended interest point detection system in accordance with the present invention.

In an aspect of the present invention, the intended interest point detection system may be used in a robotic system, where a robot needs to understand a human's intention by observing which object is attended by the human. FIG. 4 illustrates an example of such robotic application in accordance with the present invention. In this example, the scene camera and the gaze camera may reside in a vision system 42 of the robot 40. The bounding boxes of POIs may be computed by a scene processing unit 101. A gaze vector of the human may be computed by a gaze processing unit 102, and a gaze point may be computed by projecting the gaze vector on an image plane of the vision system 42. POI P401-P405 may be identified by an object detection algorithm in the scene processing unit 101. The probability value of the POI may be a factor of the distance between the gaze point and the bounding box of the POI. When the distance between the gaze point and the bounding box of the POI increases, the probability decreases.

In an aspect of the present invention, the intended interest point detection system may be used to infer the intended POI from the scene of an image display device. In such cases, scene camera 12 may not be required, where the interest point location may be obtained from the image display device. The POIs of the scene may be identified by using an object detection algorithm or by manual labelling.

Figure 5:
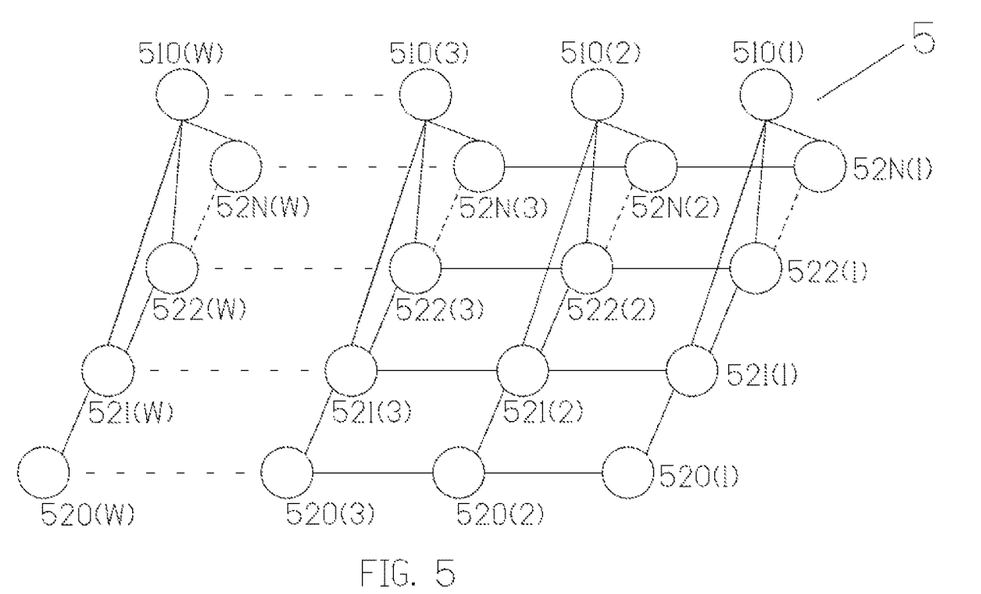
FIG. 5 illustrates a model including the layers of nodes for computing the energy value, spatial relation value, and temporal relation value.

In an embodiment, the gaze points are computed from the eye tracker, and the POIs of the scene are detected by an object detection algorithm. To infer the intended POI, the inference processing unit 103 takes inputs from the gaze points and the POIs' location information from a plurality of image frames. A relation between the gaze information and the at least one POI is characterized to an energy value, where the value decreases when the gaze location correlates the location of the POIs and/or when the intended POI is consistent in the contiguous frames. The relation is illustrated by a model as shown in FIG. 5. The model includes first layer nodes 510(1)-510(W) representing the gaze points of W frames, second layer nodes 521(1)-521(W), . . . 52N(1)-52N(W) representing the probability value of POI1, POI2, . . . POIN that is attended by the user, and second layer nodes 520(1)-520(W) representing the probability value that none of the interest points POI1, POI2, . . . POIN is attended. In an embodiment, the value of the first layer nodes 510(1)-510(W) may be in a form of 2D coordinates on a plane. In a one-hot approach, the probability value of the second layer nodes for each frame is rounded to either '1' or '0', i.e. only one node from the second layer nodes is given by '1' for each image frame, where the node valued by '1' possesses the maximum probability value than the other second layer nodes in the given image frame. For example, at frame #W, the values of the second layer nodes 520(W), 521(W), . . . , 52N(W) are [0, 0, 1, 0 . . . , 0] if the user is attending to the interest point POI2.

An energy value may be characterized by a spatial relation and/or a temporal relation. The spatial relation value is determined by the plurality of gaze information from the first layer nodes and the at least one POI from the second layer nodes at each frame. The spatial relation value is decreased when the gaze point location represented by the first layer node is correlated to the location of the POIs represented by the second layer nodes. The temporal relation value is determined from the at least one POI from the second layer nodes. The temporal relation value is decreased when probability value of the second layer nodes is consistent in the contiguous image frames. The user's intended POI is inferred by the node corresponding to the maximum probability value of the second layer nodes in an image at which the energy value is minimized.

The inference processing unit may characterize the energy value on the fly, in which the number of second layer nodes may be variant according to the given scene. The number of frames W in the model may be a hyperparameter. In an embodiment, the hyperparameter W may be adjusted dynamically based on other environmental factors such as the moving speed of the user, the moving speed of the interest point in the scene, and/or the frame rate of the cameras. For example, when the frame rate of the camera increases, the W may be set higher in order to remove the noises from eye blink.

In an embodiment, the POI location information may be obtained from an object detection algorithm, in which potential POIs are identified by bounding boxes. In another embodiment, the POI location information may be represented by contours of the objects which were obtained from an image segmentation algorithm. Various algorithms may be used for tracking and recognizing the POI, the present invention is not limited thereto.

In an embodiment, the inference unit 103 derives the first layer nodes, wherein each first layer node represents a gaze point of an image frame, and the second layer nodes, wherein each second layer node represents the probability value of a POI that is attended by the user. The number of the second layer nodes may be dynamically changed based on the number of the at least one interest point obtained in the second images; the inference unit 103 finds probability values of the plurality of second layer nodes at which the energy value is minimized. The current frame results may be used as an initial point of the next frame inference. The POI node corresponding to the maximum probability value is referred as the intended POI.

It should be noted that the relation between the plurality of gaze information and the plurality of the at least one POI is the likelihood of obtaining the gaze information given a specific POI is attended. Besides, the relation further comprises the temporal relation of the same POI being attended in contiguous frames.

In an embodiment, the values of the first layer nodes (i.e., the top layer nodes) in FIG. 5 may be the pixel coordinates of the gaze points from the past W−1 frames until the current frame, and the values of the second layer nodes (i.e., the bottom layer nodes) may be the probability of the POI attended by the user. The mathematical notation of the first layer nodes and the second layer nodes are shown as follows:

$$\{b_t = (b_t^x, b_t^y) : t \in \mathbb{Z}, T-\omega+1 \leq t \leq T\},$$

$$\{c_{t,i} : t \in \mathbb{Z}, T-\omega+1 \leq t \leq T; i = na, 1, 2, \ldots, N\}$$

where the POIs in the scene are indexed by 1, 2, . . . , N, and "na" indicates that the user is not attending to any of the indexed POIs. In this embodiment, each gaze point (top layer node) $b_t$ is connected to all the POIs (bottom layer nodes) $c_{t,i}$ in every time frame. That is, each $b_t$ is connected to corresponding $c_{t,i}$(s) to form an inter bone. An intra bone is formed between each pair of adjacent $c_{t,i}$ nodes. The inference result, provided by the vector $c_{t,i=na,1,\ldots,N}$ for a time frame t, is constrained to be a one-hot vector consisting of '0's in all elements with the exception of a single '1' used uniquely to identify the intended POI. The inference result is computed by finding the values of $c_{t,i}$ for T−ω+1≤t≤T; i=na, 1, 2, . . . , N that minimize the energy value. The nodes in the model may be dynamically changed based on the number of available POIs if the scene is dynamic.

The likelihood may be calculated based on multi-variant Gaussian distribution, overlapping ratio of gaze area and interest point area, or the combination of both. In an embodiment, it is assumed that the likelihood of the gaze point $b_t$ given an interest point $c_{t,i}$ being attended follows a Gaussian function centered at a bounding box center $u_{t,i}$ of the interest point, with a covariance matrix $\Sigma$ related to the bounding box dimensions (i.e., width and height). That is, $$P(b_t | c_{t,i} = 1) \propto \exp[-\tfrac{1}{2}(b_t - u_{t,i})^T \Sigma^{-1}(b_t - u_{t,i})]$$

In another embodiment, the covariance matrix may be defined according to the values of human gaze area dimensions.

The energy value is minimized in accordance to the spatial relation and the temporal relation values. The spatial relation value is minimized when the user's gaze point correlates or aligns with the at least one POI location, and the temporal relation value is minimized if the intended POI is consistent over contiguous image frames. In an embodiment, the energy value may be obtained by a function:

$$E(c_t; b_t, c_{t'=T-\omega+1 \ldots T, i}) =$$

-continued $$-\sum_{i=1}^{N} c_{t,i} \cdot P(b_t \mid c_{t,i} = 1) - k \cdot c_{t,i=na} + \alpha \sum_{i} \sum_{t'=T-\omega+1}^{T} \frac{1}{\omega} |c_{t,i} - c_{t',i}|$$

The above is a positive constant. The spatial relation is consisted of the first two terms:

$$-\sum_{i=1}^{N} c_{t,i} \cdot P(b_t \mid c_{t,i} = 1) - k \cdot c_{t,i=na}$$

contribute to a tendency of the intended POI that tracks the user's gaze point. The temporal relation is characterized by the last term:

$$\alpha \sum_{i} \sum_{t'=T-\omega+1}^{T} \frac{1}{\omega} |c_{t,i} - c_{t',i}|$$

contributes to a tendency of the consistency of attended POI, e.g., for removing the spikes and outliers due to eye blinks and moving/shaking/saccade effects mentioned above. The result of inferring the intended POI can be obtained by optimizing the function in the following equations:

$$c_t^* = \underset{c_t}{\operatorname{argmin}} E(c_t; b_t, c_{t'=T-\omega+1 \ldots T,i})$$

$$\text{s.t. } c_{t,i} \in \{0, 1\}, \sum_{i} c_{t,i} = 1$$

The result is typically obtained after a few iterations. If the interest point $c_{t,i}$ equals 1, the interest point $c_{t,i}$ corresponds to the intended POI of the person. In practice, the number of available POIs may change dynamically among different frames. For example, when the user is driving the vehicle to move along the street, some POIs may be occluded by objects such as other vehicles in the scene so that they disappear in a few time frames during the time interval. In some cases, the number of available POIs varies because the object recognition system fails to identify all POIs in the scene. As such, the system may model the nodes as illustrated in FIG. 5 according to the POIs appearing in the image frames within the time interval, and compute the likelihood for all of them. If a POI was missing in a time frame, a zero probability is initially assigned to its corresponding second layer node in the model.

Figure 6:
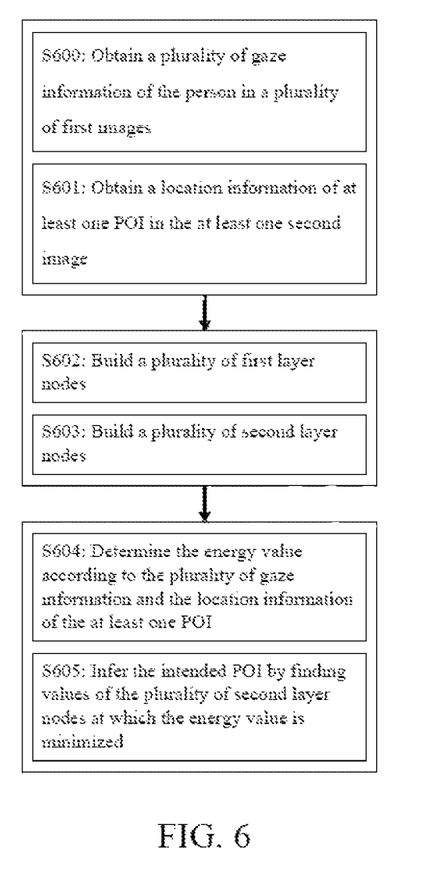
FIG. 6 illustrates a flowchart of an intended interest point detection method in accordance with the present invention.

FIG. 6 illustrates a flowchart of an example process 600 for inferring a human's intended interest point. The process 600 may be performed by a system comprising one or more computing units located in one or more locations. For example, an intended interest point detection system 1 of FIG. 1 can perform the process 600. It should be understood that the steps in the process 600 can be performed in parallel, in combination, in different order, or by fewer or additional steps, or by alternative steps in similar unless otherwise stated.

The process 600 includes the following steps: S600: obtaining a plurality of gaze information of the person in a plurality of first images; S601: obtaining a location information of at least one POI in the at least one second image; S602: building a plurality of first layer nodes, wherein each first layer node stores values for one of the plurality of gaze information in a frame; S603: building a plurality of second layer nodes, in which at least one second layer node is corresponded to each of the first layer node in time, wherein each of the plurality of second layer nodes represents one POI in a frame, and a value of the second layer node indicates whether the person is attended to the represented POI or not; S604: determining the energy value according to the plurality of gaze information and the location information of the at least one POI. The energy value is obtained by a spatial relation and/or a temporal relation, wherein the spatial relation value is determined by the plurality of gaze information from the first layer nodes and the at least one POI from the second layer nodes at each frame, and the temporal relation value is determined by the at least one POI from the second layer nodes; and S605: infer the intended POI by finding values of the plurality of second layer nodes at which the energy value is minimized. Further details are described in the embodiments aforementioned thus omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An intended interest point detection method for detecting an intended point of interest (POI) of a person from a plurality of first images and at least one second image, the intended POI detection method comprising:
   obtaining a plurality of gaze information of the person in the plurality of first images, wherein the plurality of first images are consecutive frames captured by a first camera;
   obtaining a location information of at least one POI in the at least one second image;
   building a plurality of first layer nodes, wherein each first layer node stores values for one of the plurality of gaze information in a frame;
   building a plurality of second layer nodes, in which at least one second layer node is corresponded to each of the first layer node in time, wherein each of the plurality of second layer nodes represents a POI in a frame, and a value of the second layer node is a probability value indicating whether the person is attended to the represented POI or not;
   determining a spatial relation value by the first layer node and its time-corresponded at least one second layer node, wherein the spatial relation value is minimized when the gaze point location represented by the first layer node is correlated to the location of the POIs represented by the second layer nodes;
   determining a temporal relation value by a plurality of second layer nodes in different time frames, wherein the temporal relation value is minimized if the values of the second layer nodes representing the POIs in the consecutive frames are the same;
   determining an energy value by the plurality of gaze information and the at least one POI, wherein the energy value is decreased when the gaze point location is correlated to a POI, and/or when the intended POI is consistent in contiguous time frames; and
   minimizing the energy value composed by spatial relation and/or temporal relation and inferring the intended POI from the node corresponding to the maximum probability value of the second layer nodes in an image at which the energy value is minimized.

2. The intended interest point detection method of claim 1, wherein the number of consecutive frames is adapted to a moving speed of the person, a moving speed of the at least one POI, and/or the frame rate of the first camera.

3. The intended interest point detection method of claim 1, wherein the step of inferring the intended POI by minimizing the energy value comprises:
finding values of the plurality of second layer nodes at which the energy value is minimized.

4. The intended interest point detection method of claim 1, wherein the number of the second layer nodes are dynamically changed based on the number of POIs obtained in the at least one second image.

5. The intended interest point detection method of claim 1, wherein the plurality of gaze information is a gaze point, a gaze area, or a probability distribution of a gaze region.

6. The intended interest point detection method of claim 1, wherein the spatial relation between the plurality of gaze information and the at least one POI comprises a likelihood of the person's gaze point to the location of the at least one POI.

7. The intended interest point detection method of claim 1, wherein the intended POI is either one of the at least one POI or none of the at least one POI.

8. The intended interest point detection method of claim 6, wherein the likelihood is calculated based on a Gaussian distribution function.

9. An intended interest point detection system for detecting an intended point of interest (POI) of a person from a plurality of first images and at least one second image, the intended interest point detection system comprising:
a gaze processing unit configured to obtain a plurality of gaze information of the person in the plurality of first images, wherein the plurality of first images are consecutive frames captured by a first camera;
a scene processing unit configured to obtain a location information of at least one POI in the at least one second image; and
an inference processing unit coupled to the gaze processing unit and the scene processing unit, and configured to receive the plurality of gaze information and the location information of the at least one POI, the inference processing unit executing instructions to perform operations comprising:
building a plurality of first layer nodes, in which each first layer node stores values for one of the plurality of gaze information in a frame;
building a plurality of second layer nodes, in which at least one second layer node is corresponded to each of the first layer node in time, each of the plurality of second layer nodes represents a POI in a frame, and a value of the second layer node is a probability value indicating whether the person is attended to the represented POI or not;
determining a spatial relation value by the first layer node and its time-corresponded at least one second layer node, wherein the spatial relation value is minimized when the gaze point location represented by the first layer node is correlated to the location of the POIs represented by the second layer nodes;
determining a temporal relation value by a plurality of second layer nodes in different time frames, wherein the temporal relation value is minimized if the values of the second layer nodes representing the POIs in the consecutive frames are the same;
determining an energy value by the plurality of gaze information and the at least one POI; and
minimizing the energy value composed by spatial relation and/or temporal relation, and inferring the intended POI from the node corresponding to the maximum probability value of the second layer nodes in an image at which the energy value is minimized;
wherein the energy value is decreased when the gaze point location is correlated to a POI, and/or when the intended POI is consistent in contiguous time frames.

10. The intended interest point detection system of claim 9, wherein the number of consecutive frames is adapted to a moving speed of the person, a moving speed of the at least one POI, and/or the frame rate of the first camera.

11. The intended interest point detection system of claim 9, wherein the inference processing unit finds values of the plurality of second layer nodes at which the energy value is minimized.

12. The intended interest point detection system of claim 9, wherein the number of the second layer nodes are dynamically changed based on the number of POIs obtained in the at least one second image.

13. The intended interest point detection system of claim 9, wherein the plurality of gaze information is a gaze point, a gaze area, or a probability distribution of a gaze region.

14. The intended interest point detection system of claim 9, wherein the spatial relation between the plurality of gaze information and the at least one POI comprises a likelihood of the person's gaze point to the location of the at least one POI.

15. The intended interest point detection system of claim 9, wherein the intended POI is either one of the at least one POI or none of the at least one POI.

16. An intended interest point detection method for detecting an intended point of interest (POI) of a person in captured images, the intended interest point detection method comprising:
obtaining a plurality of gaze information of the person in the captured images;
obtaining a location information of at least one POI in the captured images;
building a plurality of first layer nodes, wherein each first layer node stores values for one of the plurality of gaze information in a frame;
building a plurality of second layer nodes, in which at least one second layer node is corresponded to each of the first layer node in time, wherein each of the plurality of second layer nodes represents a POI in a frame, and a value of the second layer node is a probability value indicating whether the person is attended to the represented POI or not;
determining a spatial relation value by the first layer node and its time-corresponded at least one second layer node, wherein the spatial relation value is minimized when the gaze point location represented by the first layer node is correlated to the location of the POIs represented by the second layer nodes;
determining a temporal relation value by a plurality of second layer nodes in different time frames, wherein the temporal relation value is minimized if the values of the second layer nodes representing the POIs in the consecutive frames are the same;
determining an energy value by the plurality of gaze information and the at least one POI; and
minimizing the energy value composed by spatial relation and/or temporal relation and inferring the intended POI from the node corresponding to the maximum probability value of the second layer nodes in an image at which the energy value is minimized;

wherein the energy value is decreased when the gaze point location is correlated to a POI, and/or when the intended POI is consistent in contiguous time frames.

* * * * *